United States Patent
Liu et al.

(10) Patent No.: US 9,721,591 B1
(45) Date of Patent: Aug. 1, 2017

(54) MAGNETIC RECORDING WRITE APPARATUS HAVING A POLE HAVING AN ASPECT RATIO GREATER THAN ONE AND AN AUXILIARY POLE

(71) Applicant: Western Digital (Fremont), LLC, Fremont, CA (US)

(72) Inventors: Feng Liu, San Ramon, CA (US); Zhigang Bai, Fremont, CA (US); Peng Luo, San Ramon, CA (US); Jinqiu Zhang, Fremont, CA (US); Ming Sun, San Jose, CA (US); Xiaoyu Yang, Union City, CA (US); Yifan Zhang, San Jose, CA (US); Xiaojun Zhang, Fremont, CA (US); Ming Jiang, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 15/097,182

(22) Filed: Apr. 12, 2016

(51) Int. Cl.
 *G11B 5/127* (2006.01)
 *G11B 5/31* (2006.01)
 *G11B 5/21* (2006.01)
 *G11B 5/147* (2006.01)

(52) U.S. Cl.
 CPC .......... *G11B 5/3116* (2013.01); *G11B 5/1272* (2013.01); *G11B 5/1278* (2013.01); *G11B 5/1475* (2013.01); *G11B 5/21* (2013.01); *G11B 5/3143* (2013.01)

(58) Field of Classification Search
 CPC ....... G11B 5/1278; G11B 5/1475; G11B 5/21; G11B 5/3116

USPC ........... 360/125.03, 125.12, 125.14, 125.15, 360/125.28, 125.29
 See application file for complete search history.

(56) References Cited

U.S. PATENT DOCUMENTS

| | | | |
|---|---|---|---|
| 6,906,894 B2 | 6/2005 | Chen et al. | |
| 8,179,636 B1 * | 5/2012 | Bai ...................... | G11B 5/1278 360/125.17 |
| 8,405,930 B1 | 3/2013 | Li et al. | |
| 8,441,755 B2 * | 5/2013 | Sasaki .................... | G11B 5/17 360/123.03 |
| 8,456,980 B1 | 6/2013 | Thayamballi | |
| 8,547,660 B2 * | 10/2013 | Allen ..................... | G11B 5/112 360/125.13 |
| 8,619,508 B1 | 12/2013 | Krichevsky et al. | |
| 8,786,983 B1 * | 7/2014 | Liu ....................... | G11B 5/3123 360/123.02 |

(Continued)

Primary Examiner — Jefferson Evans
(74) Attorney, Agent, or Firm — Foley & Lardner LLP

(57) ABSTRACT

A magnetic write apparatus has a media-facing surface (MFS) and includes an auxiliary pole, coil(s) and a main pole having a pole tip and a yoke. The pole tip occupies part of the MFS. The yoke has a yoke length measured from the MFS in a yoke direction perpendicular to the MFS. The yoke length is less than four microns. The main pole has a total length in the yoke direction and a width in a cross-track direction. The main pole is continuous along the total length. The aspect ratio of the main pole is the total length divided by the width and exceeds one. The main pole includes surface(s) having a nonzero acute flare angle from the MFS. The auxiliary pole is adjacent to the main pole and recessed from the MFS by not more than 1.05 micron. The coil(s) energizes the main pole and have not more than two turns.

22 Claims, 9 Drawing Sheets

(56) References Cited

U.S. PATENT DOCUMENTS

| | | | |
|---|---|---|---|
| 8,917,480 B2 * | 12/2014 | Liu | G11B 5/1278 360/125.09 |
| 9,053,715 B1 | 6/2015 | Wang et al. | |
| 2006/0002021 A1 * | 1/2006 | Li | G11B 5/1278 360/125.06 |
| 2007/0195455 A1 * | 8/2007 | Kobayashi | G11B 5/3116 360/125.12 |
| 2008/0297952 A1 * | 12/2008 | Kameda | G11B 5/3116 360/317 |
| 2009/0015965 A1 * | 1/2009 | Sunwoo | G11B 5/3123 360/110 |
| 2014/0313614 A1 * | 10/2014 | Hsiao | G11B 5/17 360/99.08 |

\* cited by examiner

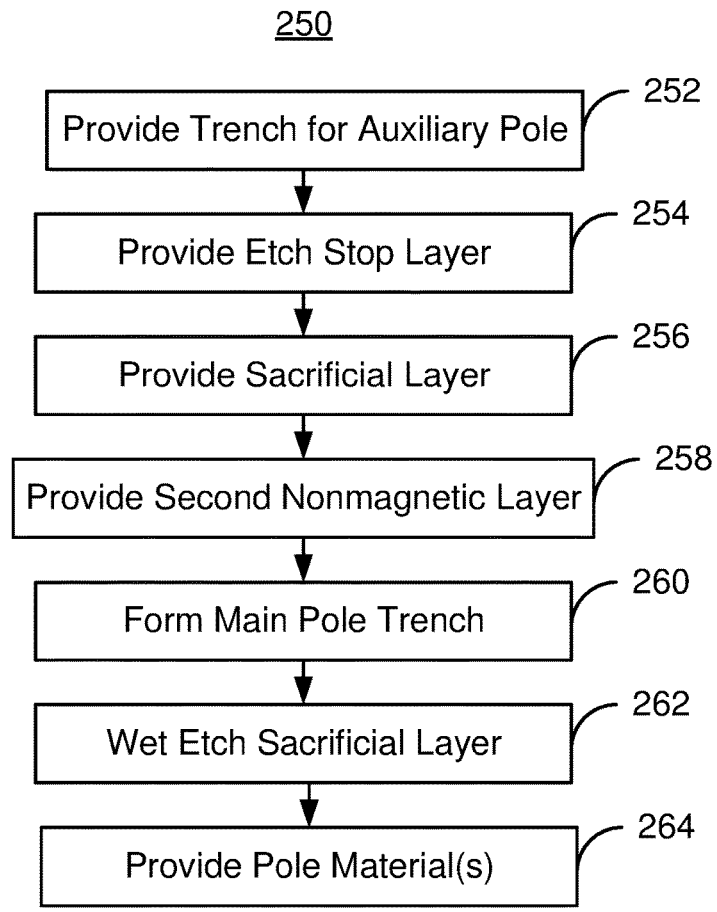
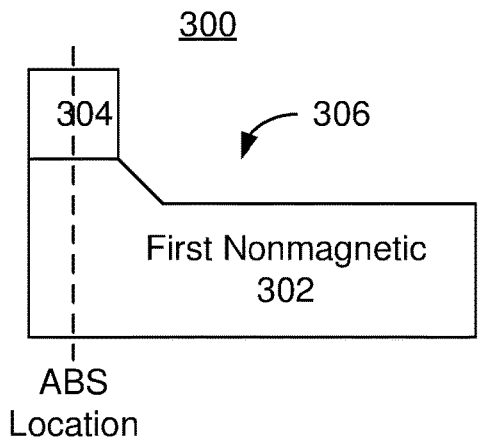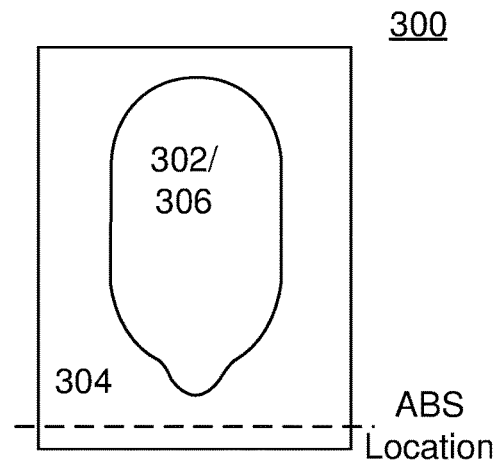
FIG. 7A  FIG. 7B

MAGNETIC RECORDING WRITE APPARATUS HAVING A POLE HAVING AN ASPECT RATIO GREATER THAN ONE AND AN AUXILIARY POLE

BACKGROUND

FIG. 1 depicts a top view of a conventional magnetic recording apparatus 10. The magnetic recording apparatus 10 may be a perpendicular magnetic recording (PMR) apparatus or other magnetic write apparatus. The conventional magnetic recording apparatus 10 may be a part of a merged head including the write apparatus 10 and a read apparatus (not shown). The write apparatus 10 includes a pole 12 as well as other components. For example, the write apparatus may include a nonmagnetic gap layer, side shield(s), a leading shield, a trailing shield and coils for energizing the pole 12. The pole has a total length d1 in the yoke direction and a width d2 in the cross track direction. The aspect ratio is the length divided by the width (d1/d2). The aspect ratio is significantly less than one and may be less than 0.5.

Although the conventional magnetic recording apparatus 10 functions, there are drawbacks. For higher areal densities, higher data rates are also desired. A high data rate requires a reduced field rise time while maintaining a sufficient field magnitude. Similarly, sufficiently small wide area track erasure (WATer) and domain lockup are desired. The conventional magnetic recording apparatus 10 may be unable to meet these specifications.

BRIEF DESCRIPTION OF SEVERAL VIEWS OF THE DRAWINGS

FIG. 6 is a flow chart depicting an exemplary embodiment of a method for providing a portion of a magnetic recording apparatus.

FIGS. 7A-7B through 14A-14B depict various views of another exemplary embodiment of a magnetic recording apparatus during fabrication.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 1:
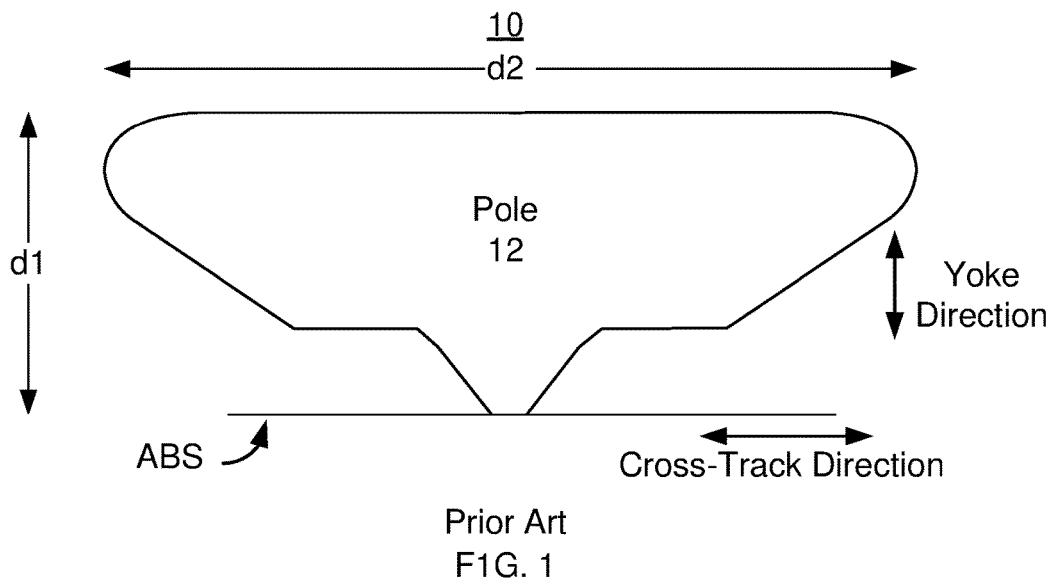
FIG. 1 depicts a top view of a conventional magnetic recording apparatus.
Figure 2A:
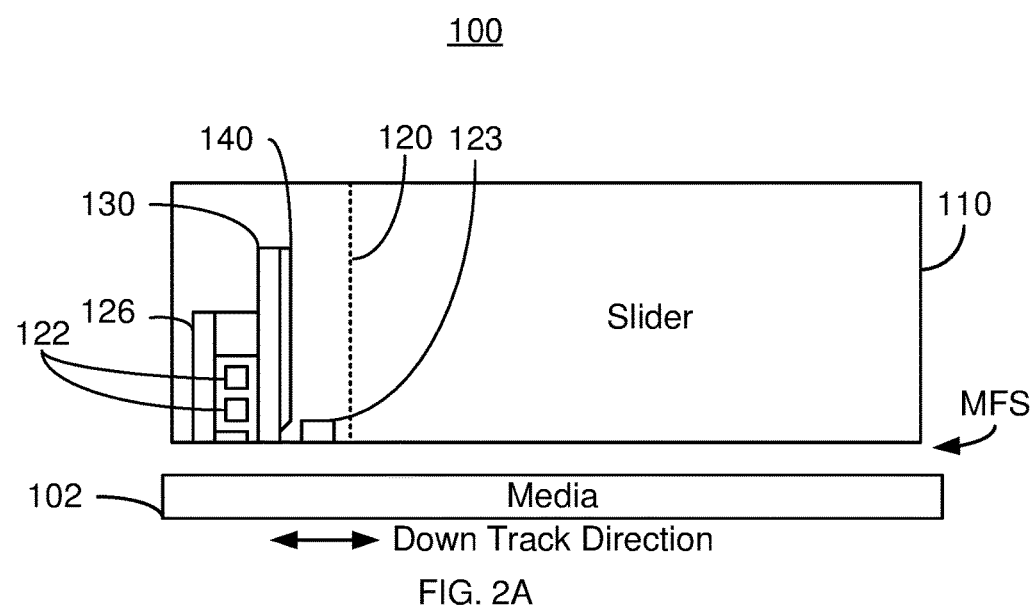
FIGS. 2A, 2B and 2C depict side, close-up apex and top views of an exemplary embodiment of a magnetic recording disk drive.
Figure 2B:
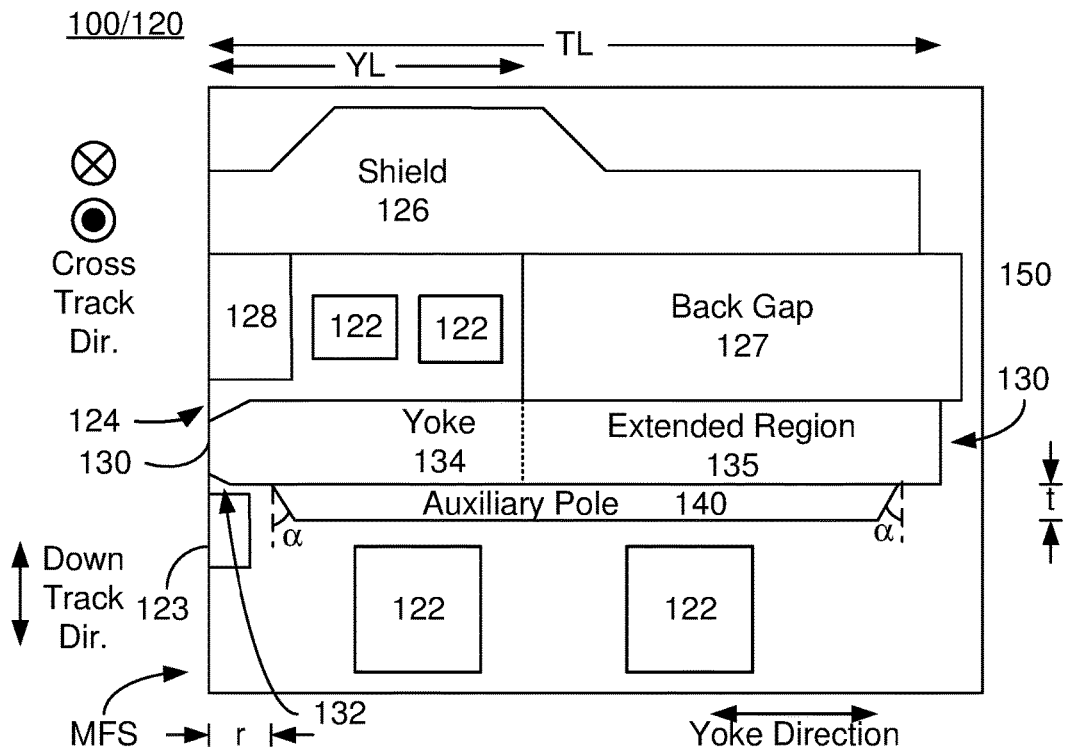
Figure 2C:
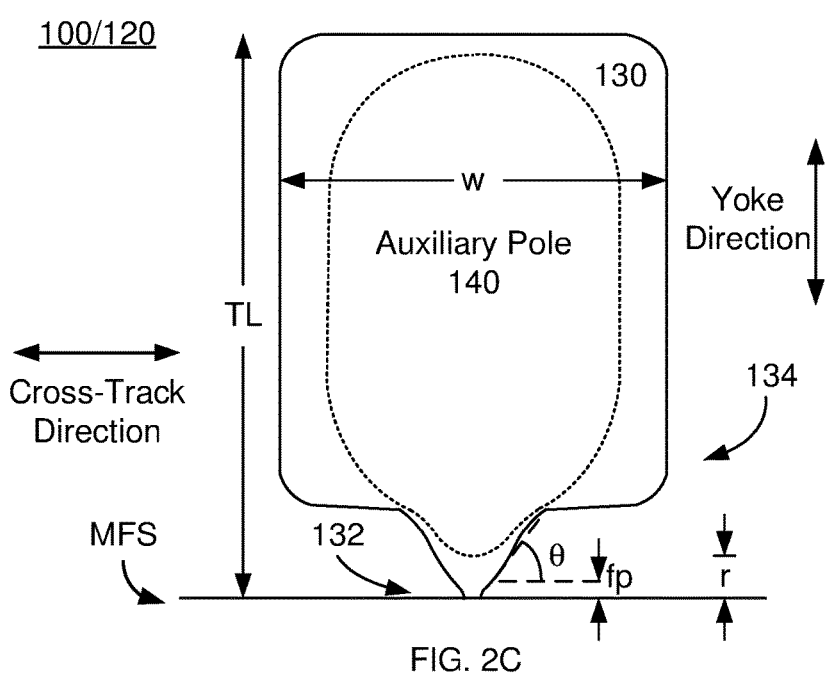

FIGS. 2A, 2B and 2C depict side, close-up apex and top views of an exemplary embodiment of a portion of a disk drive 100 including a write apparatus 120. For clarity, FIGS. 2A, 2B and 2C are not to scale. For simplicity not all portions of the disk drive 100 and apparatus 120 are shown. In addition, although the disk drive 100 and write apparatus 120 are depicted in the context of particular components other and/or different components may be used. For example, circuitry used to drive and control various portions of the disk drive 100 is not shown. For simplicity, only single components are shown. However, multiples of each components and/or and their sub-components, might be used. The disk drive 100 may be a PMR disk drive. However, in other embodiments, the disk drive 100 may be configured for other types of magnetic recording.

The disk drive 100 includes media 102, a slider 110, a write apparatus 120 and a media-facing surface (MFS). Because the data storage device is a disk drive, the MFS is an air-bearing surface (ABS). The write apparatus 120 is fabricated on the slider 110 and includes a MFS. In the embodiment shown, the MFS is proximate to the media 102 during use. Although not shown, the slider 110 and thus the apparatus 120 are generally attached to a suspension (not shown). In general, the disk drive 100 includes a write apparatus 120 and a read apparatus (not shown). However, for clarity, only the write apparatus 120 is shown. The write apparatus 120 includes coils 122, write gap 124, main pole 130 and auxiliary pole 140. The apparatus may also include a leading shield 123, trailing shield 126 with pedestal 128, back gap 127, a bottom gap between the main pole 130 and leading shield 123, side gap (not shown) and side shields (not shown). Multiple structures on which the leading shield 123 and other components are fabricated may reside below the components shown. As discussed above, portions of the components 122, 123, 124, 126, 127, 128, 130 and 140 may include multiple layers. In other embodiments, different and/or additional components may be used in the write apparatus 120.

The coil(s) 122 are used to energize the main pole 130. Two turns 122 are depicted in FIGS. 2A and 2B. Another number of turns may, however, be used. For example, a single turn may be used. Note that only a portion of the coil(s) 122 is shown in FIG. 2A. Additional turns and/or additional layers of coils may be used. For example, the coil(s) 122 are shown in FIG. 2B as forming a helical coil around the main pole 130 and auxiliary pole 140. In other embodiments, the coil(s) 122 may form a spiral, or pancake, coil. In such embodiments, additional portions of the coil(s) 122 may be located further from MFS instead of on the leading side of the main pole 130. In addition, other coil(s) and/or another number of layers may be present.

The main pole 130 is ferromagnetic and may have a high saturation magnetization in excess of 2.0 T. For example, the main pole 130 may utilize material(s) having a saturation magnetization of 2.4 T or more. The main pole 130 includes a pole tip 132 close to the MFS and a yoke 134 recessed from the MFS. In some embodiments, the pole tip 132 occupies a portion of the MFS. This is shown in FIGS. 2A-2C. The pole tip region 132 also includes sidewalls in the cross track direction. The sidewalls are generally configured such that the pole 130 has a bottom and a top wider than the bottom. In addition, the sidewalls are oriented at a flare angle, θ, from a direction parallel to the MFS. The flare angle is greater than zero and less than ninety degrees. In some embodiments, the flare angle is at least thirty degrees and not more than seventy degrees. The flare angle may also be at least fifty-five degrees. For example, the flare angle may be nominally sixty degrees. Other flare angles are possible. In addition, the flare angle occurs at a flare point that may be recessed from the MFS by a distance, fp. In some embodiments, the flare point is recessed from the MFS by at least 0.1 micron and not more than 0.45 micron. For example, the flare point may be recessed by nominally 0.25 micron. In other embodiments, other recess distances for the flare point, including a zero recess distance, are possible.

The pole tip region 132 is shown as having bottom/leading surface closer to the leading shield 123 and a top/trailing surface close to the trailing shield pedestal 128. As can be seen in FIG. 2B, in the embodiment shown, both the leading surface and the trailing surface are beveled. In other embodiments, one or both of the leading surface and trailing surface may not be beveled, instead extending in a direction substantially perpendicular to the MFS.

The pole tip 132 is between the yoke 134 and the MFS. The yoke 134 has a yoke length, YL, in the yoke direction. As can be seen in FIGS. 2B and 2C, the yoke direction is perpendicular to the MFS. The yoke length is measured from the MFS to the MFS facing surface of the back gap 127. In the embodiment shown, the yoke length is less than four microns. For example, the yoke length may be nominally 3.7 micrometers or less.

The main pole 130 extends further from the MFS than the yoke length. The main pole 130 has a total length, TL, in the yoke direction. In some embodiments, TL is not more than ten microns. The main pole 130 is continuous in the yoke direction. Stated differently, the main pole does not include an apertures extending through the main pole 130. The main pole 130 also has a width, w, in the cross-track direction. This width is shown in FIG. 2C. The aspect ratio for the main pole 130 is the total length divided by the width (TL/w). The aspect ratio for the main pole 130 exceeds one. The aspect ratio may be is at least 1.2 and not more than 2. In some embodiments, the aspect ratio is at least 1.5 and may not be more than 1.7. In the embodiment shown, the main pole 130 has a substantially rectangular region from the yoke 134/extended region 135. The corners of the main pole 130 may, however, be rounded. Such an embodiment is shown in FIG. 2C. Other shapes are possible.

The auxiliary pole 140 is adjacent to the main pole 130 and on the leading surface side of the main pole 130. As can be seen in FIG. 2C, the footprint of the auxiliary pole 140 may be different from the main pole 130. Stated differently, shape of the auxiliary pole 140 may not match that of yoke/yoke extension of the main pole 130. In other embodiments, the footprint of the auxiliary pole 140 may match that of the main pole 130. The outer edges of the auxiliary pole 140 in the cross-track and yoke direction are shown as being recessed from the outer edges of the main pole 130. The outer edge(s) of the auxiliary pole 130 may be recessed from those of the main pole 130 from 0 microns to up to 0.3 microns. This recess amount may vary. For example, different auxiliary poles 140 may have different recess amounts and/or different portions of an auxiliary pole 140 may have different recess amounts. The front of the auxiliary pole 140 is also recessed from the MFS by an amount, r. The recess amount is desired to be small. For example, the auxiliary pole 140 may have a front surface recessed from the MFS by not more than 1.05 micron. In some embodiments, the auxiliary pole 140 is recessed from the MFS by at least 0.1 micron and not more than 0.45 micron. Thus, the auxiliary pole 140 may be relatively close to the MFS.

The auxiliary pole 140 may also be relatively thin. The auxiliary pole 140 may have a thickness, t, in a down track direction perpendicular to the cross-track direction of at least 0.2 micron and not more than 0.5 micron. For example, the auxiliary pole 140 may be nominally 0.3 microns thick. Although relatively thin, in some embodiments, the auxiliary pole 140 may be made from high saturation magnetization materials. For example, the magnetic material(s) used for the auxiliary pole 140 may have a saturation magnetization of at least 2.0 T. In some embodiments, the magnetic material(s) for the auxiliary pole 140 may have a saturation magnetization of 2.4 T or more.

As can be seen in FIG. 2B, the sides of the auxiliary pole 140 may be at a nonzero angle, α, from a down track direction. In some embodiments, this angle is at least fifteen degrees and not more than fifty degrees. In some cases, the front (MFS facing), side and/or back surface(s) of the auxiliary pole 140 form this angle. In other embodiments, the one or more of the front, side and back surfaces of the auxiliary pole 140 may be parallel to the MFS.

The magnetic data storage device 100 may exhibit improved performance. The short yoke length, large aspect ratio and flare of the main pole 130 in conjunction with the auxiliary pole 140 may allow for reduced rise time and improved saturation performance while maintaining a sufficient write field. In addition, the write apparatus 120 may still have acceptable wide area track erasure (WATEr) and domain lockup. Thus, performance of the disk drive 100 and write apparatus 120 may be improved.

Figure 3A:
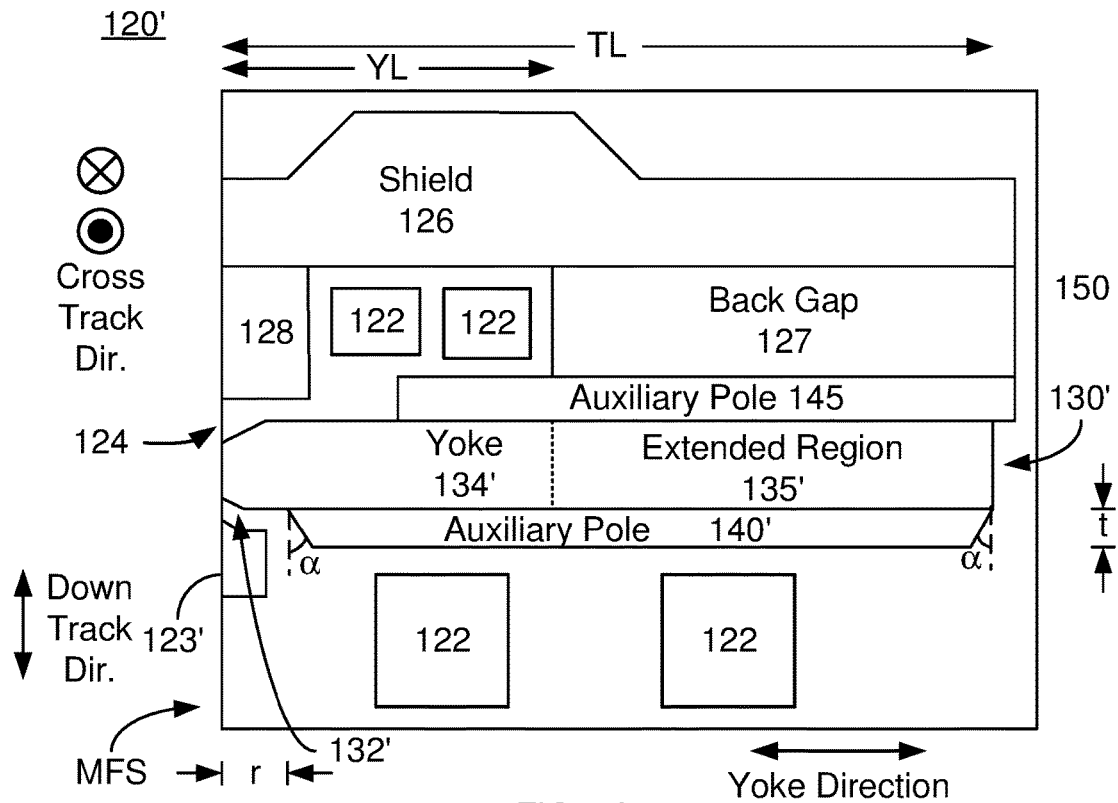
FIGS. 3A and 3B depict apex and top views of another exemplary embodiment of a magnetic recording disk drive.
Figure 3B:
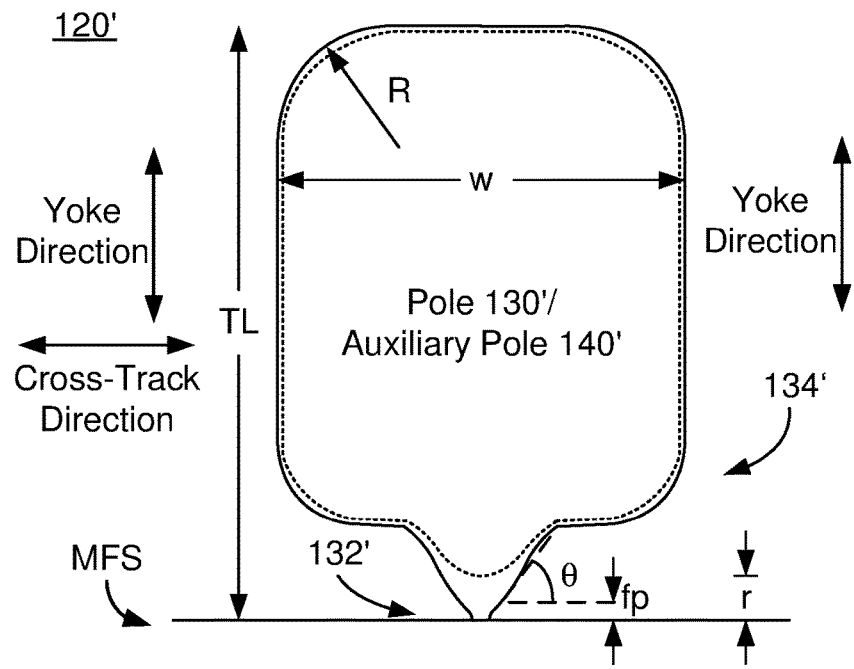

FIGS. 3A and 3B depict apex and plan views of another exemplary embodiment of a magnetic recording apparatus 120' that may be used in a data storage device such as the data storage device 100. For clarity, FIGS. 3A-3B are not to scale. For simplicity not all portions of the write apparatus 120' are shown. The data storage device may but need not be a disk drive. The magnetic write apparatus 120' is analogous to the write apparatus 120 and may be used in the magnetic disk drive 100. Thus, analogous components have similar labels. Further, as the side and ABS views of the apparatus 120' are analogous to that of the apparatus 120, only plan and apex views are shown. Thus, the write apparatus 120' includes coils 122, write gap 124, optional leading shield 123', optional trailing shield 126 having pedestal 128, back gap 127, main pole 130' and auxiliary pole 140' that are analogous to the coils 122, write gap 124, leading shield 123, trailing shield 126 having pedestal 128, main pole 130 and auxiliary pole 140, respectively. The magnetic write apparatus 120' also includes an additional auxiliary pole 145. The additional auxiliary pole 145 may be recessed from the MFS by less than four microns. In some embodiments, the surface of the auxiliary pole 145 closest to the MFS may be nominally at least one and not more than three microns from the MFS.

The main pole 130' includes a pole tip 132', a yoke 134' and an extended region 135' that are analogous to the pole tip 132, the yoke 134 and the extended region 135, respectively. For example, the yoke length, YL, is less than four microns. The yoke length may be nominally 3.7 micrometers or less. The main pole 130' has a total length, TL, in the yoke direction and is continuous in the yoke direction. In some embodiments, TL is not more than ten microns. The main pole 130' also has a width, w, in the cross-track direction. The aspect ratio for the main pole 130' (TL/w) exceeds one. The aspect ratio may be is at least 1.2 and not more than 2. In some embodiments, the aspect ratio is at least 1.5 and may not be more than 1.7.

In the embodiment shown, the main pole 130' has a substantially rectangular region from the yoke 134'/extended region 135'. The corners of the main pole 130' are, however, rounded. Such an embodiment is shown in FIG. 3B. The corners of the main pole 130' have a radius of curvature, R. The radius of curvature may be at least two microns and not more than four microns. In some embodiments, the radius of curvature is nominally three microns. In addition, the back gap 127, shield 128 and additional auxiliary pole 145 extend further in the yoke direction than the main pole 130'. However, other configurations are possible.

The auxiliary pole 140' is adjacent to the main pole 130' and on the leading surface side of the main pole 130'. In the embodiment shown in FIGS. 3A-3B, the footprint of the auxiliary pole 140' matches that of the main pole 130'. As discussed above, the auxiliary pole 140' is analogous to the auxiliary pole 140. Thus, the outer edges of the auxiliary pole 140' in the cross-track and yoke direction may be recessed from the outer edges of the main pole 130'. For example, this recess may be from 0 microns to up to 0.3 microns. The front of the auxiliary pole 140' is also recessed from the MFS by an amount, r. For example, the auxiliary pole 140' may have a front surface recessed from the MFS by not more than 1.05 micron. In some embodiments, the auxiliary pole 140' is recessed from the MFS by at least 0.1 micron and not more than 0.45 micron. The auxiliary pole 140' may have a thickness, t, in a down track direction perpendicular to the cross-track direction of at least 0.2 micron and not more than 0.5 micron. For example, the auxiliary pole 140 may be nominally 0.3 microns thick. The auxiliary pole 140 may be made from high saturation magnetization materials. For example, the magnetic material(s) used for the auxiliary pole 140 may have a saturation magnetization of at least 2.0 T. In some embodiments, the magnetic material(s) for the auxiliary pole 140 may have a saturation magnetization of 2.4 T or more. One or more of the sides of the auxiliary pole 140 may be at a nonzero angle, α, from a down track direction. In some embodiments, this angle is at least fifteen degrees and not more than fifty degrees.

The magnetic recording apparatus 120' shares the benefits of the data storage device 100 and magnetic recording apparatus 120. The short yoke length, large aspect ratio and flare of the main pole 130' in conjunction with the auxiliary pole 140' may allow for reduced rise time and improved saturation performance while maintaining a sufficient write field. In addition, the write apparatus 120' may still have acceptable WATEr and domain lockup. Thus, performance of the disk drive 100 and write apparatus 120' may be improved.

Figure 4A:
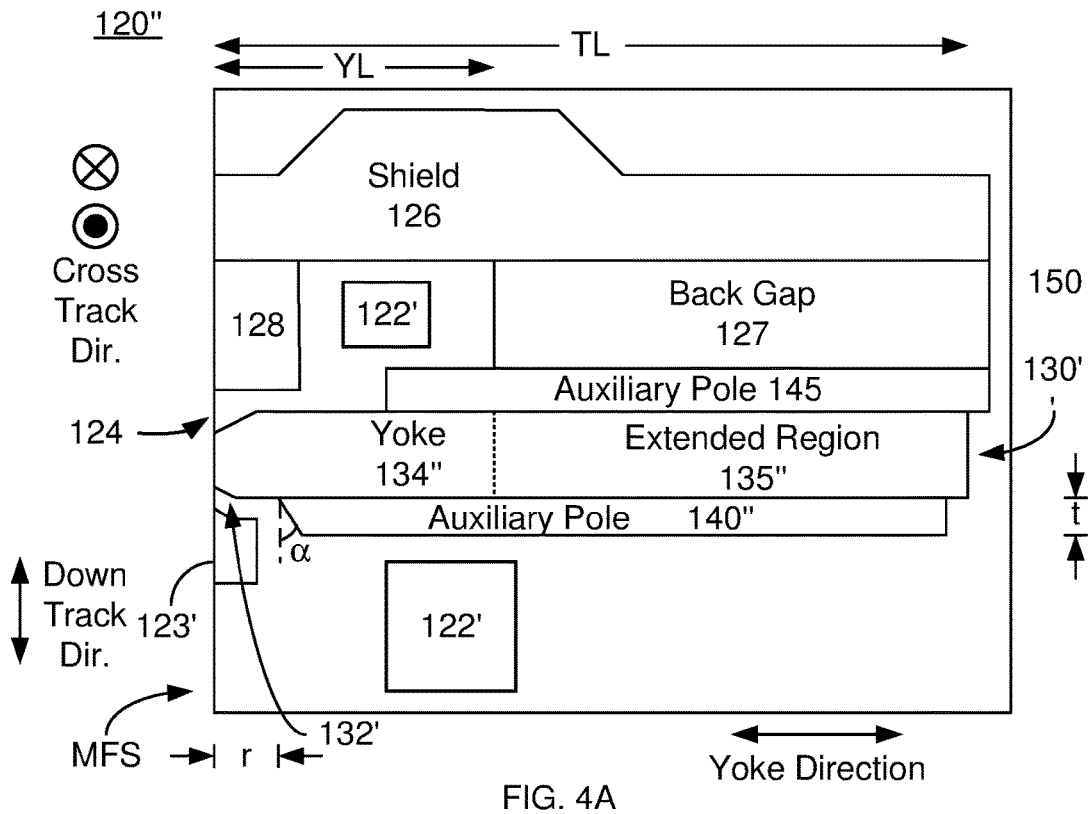
FIGS. 4A and 4B depict apex and top views of another exemplary embodiment of a magnetic recording disk drive.
Figure 4B:
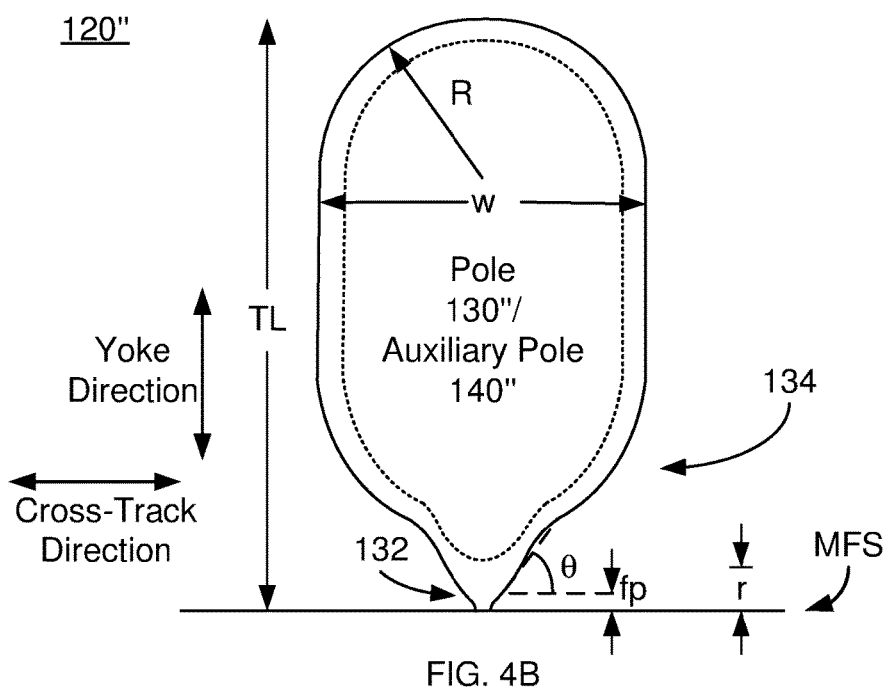

FIGS. 4A and 4B depict apex and plan views of another exemplary embodiment of a magnetic recording apparatus 120" that may be used in a data storage device such as the data storage device 100. For clarity, FIGS. 4A-4B are not to scale. For simplicity not all portions of the write apparatus 120" are shown. The data storage device may but need not be a disk drive. The magnetic write apparatus 120" is analogous to the write apparatus 120/120' and may be used in the magnetic disk drive 100. Thus, analogous components have similar labels. Further, as the side and ABS views of the apparatus 120" are analogous to that of the apparatus 120, only plan and apex views are shown. Thus, the write apparatus 120" includes coils 122', write gap 124, optional leading shield 123', optional trailing shield 126 having pedestal 128, back gap 127, main pole 130" and auxiliary pole 140" that are analogous to the coils 122, write gap 124, leading shield 123, trailing shield 126 having pedestal 128, main pole 130/130' and auxiliary pole 140/140', respectively. The magnetic write apparatus 120" also includes an additional auxiliary pole 145. The additional auxiliary pole 145 may be recessed by less than four microns. In some embodiments, the surface of the auxiliary pole 145 closest to the MFS may be nominally at least one and not more than three microns from the MFS. In addition, in the embodiment shown, the coil 122' has a single turn. Thus, the write apparatus 120" has fewer than two turns.

The main pole 130" includes a pole tip 132", a yoke 134" and an extended region 135" that are analogous to the pole tip 132/132', the yoke 134/134' and the extended region 135/135', respectively. Thus, the lengths, widths, materials, and other characteristics of the main pole 130" may be analogous to those of the main pole(s) 130 and/or 130'. However, in the embodiment depicted in FIGS. 4A and 4B, the corners of the main pole 130" are significantly more rounded and have a radius of curvature, R, in the range described above. Thus, the rear surface of the main pole 130" has a substantially semicircular footprint.

The auxiliary pole 140" is adjacent to the main pole 130" and on the leading surface side of the main pole 130". The auxiliary pole 140" is also analogous to the auxiliary pole(s) 140 and/or 140'. Thus, the lengths, widths, materials, and other characteristics of the auxiliary pole 140" may be analogous to those of auxiliary pole(s) 140 and/or 140'. The auxiliary pole 140" has a footprint that matches the footprint of the main pole 130". Thus, the rear surface of the auxiliary pole 140" may also be substantially semicircular in shape. In addition, as shown in FIG. 4B, the auxiliary pole 140" may be recessed from the edges of the main pole 130". In the embodiment shown, the front surface of the auxiliary pole 140" that faces the MFS is at a nonzero acute angle, α, from the MFS. However, the back surface of the auxiliary pole 140" is substantially parallel to the MFS. The sides of the auxiliary pole 140" may be parallel to the MFS or at an angle from the MFS. In other embodiments, other angle(s) are possible for the sides of the auxiliary pole 140".

The magnetic recording apparatus 120" shares the benefits of the data storage device 100 and magnetic recording apparatus 120 and/or 120'. The short yoke length, large aspect ratio and flare of the main pole 130" in conjunction with the auxiliary pole 140" may allow for reduced rise time and improved saturation performance while maintaining a sufficient write field. In addition, the write apparatus 120" may still have acceptable WATEr and domain lockup. Thus, performance of the disk drive 100 and write apparatus 120" may be improved.

Various features of the magnetic recording apparatuses 120, 120' and 120" have been depicted and described herein. One of ordinary skill in the art will recognize that these features may be combined in other manners not explicitly disclosed herein.

Figure 5:
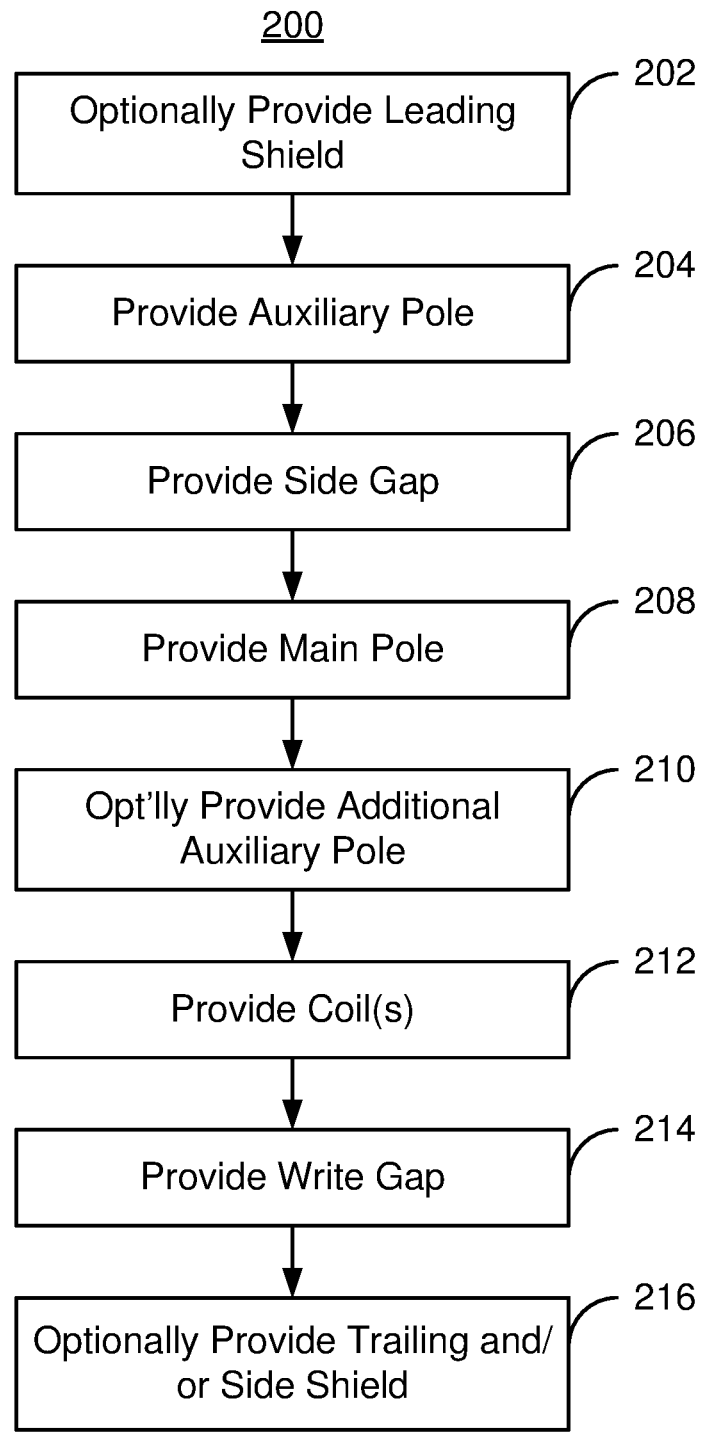
FIG. 5 is a flow chart depicting an exemplary embodiment of a method for providing a magnetic recording apparatus.

FIG. 5 depicts an exemplary embodiment of a method 200 for providing a magnetic recording apparatus 120, 120' and/or 120". For simplicity, some steps may be omitted, interleaved, combined and/or include substeps. The method 200 is also described in the context of providing a data storage device 100 and magnetic recording apparatus 120 depicted in FIGS. 2A-2C. The method 200 may also be used to fabricate other magnetic recording apparatuses including but not limited to any combination of 120' and/or 120". The method 200 may be used to fabricate multiple magnetic recording heads at substantially the same time. The method 200 is also described in the context of particular layers. A particular layer may include multiple materials and/or multiple sub-layers. The method 200 also may start after formation of other portions of the magnetic recording head. For example, the method 200 may start after a read apparatus, return pole/leading shield and/or other structure have been fabricated.

Referring to FIGS. 2A-2C and 5, the leading shield 123 may optionally be provided, via step 202. The auxiliary pole 140 is provided, via step 204. Step 254 may include using one or more damascene processes. For example, a trench may be formed in a layer. The trench may be fabricated such that portions of the trench have the desired shape and location of the auxiliary pole 140. The width of the trench may have the desired footprint of the auxiliary pole. In addition, the sidewalls of the trench may be angled from parallel to the MFS. A seed layer may optionally be provided. The material(s) for the auxiliary pole 140 are deposited, for example via plating. One or more ferromagnetic materials may be used. Other methods may also be used to form the auxiliary pole 140 including but not limited to full film deposition of the appropriate materials and removal for example via milling. Further, in some embodiments, a sacrificial material may be deposited first and later removed. The magnetic materials for the auxiliary pole 140 may be provided when the materials for the main pole are provided. In some such embodiments, the same magnetic materials are used for the auxiliary pole 140 as for the main pole 130.

The side gap may be provided, via step 206. Step 206 may be performed before or interleaved with step(s) 204 and/or 208. For example, if a damascene process is used for the main pole, then the side gap may be deposited in the trench for the main pole 130 before deposition of ferromagnetic pole material(s).

The main pole is provided, via step 208. In some embodiments, a damascene process may be used for step 208. For example, a trench may be formed in a layer. The trench may be fabricated such that portions of the trench have the desired shape and location of the main pole 130. The width of the trench may also vary to form pole tip 132, yoke 134 and yoke extension 135 of the main pole 130. The trench may also be configured so that the beveled leading surface is naturally formed as the trench is filled. The material(s) for the pole 130 are deposited, for example via plating. One or more ferromagnetic materials may be used. In some embodiments, ferromagnetic material(s) are used for both the main pole 130 and the auxiliary pole 140. In some such embodiments, sacrificial layers used in forming the auxiliary pole 140 are removed just prior to deposition of the ferromagnetic materials for the main pole 130 and auxiliary pole 140. In other embodiments, some ferromagnetic material(s) may be used for the main pole 130, but different ferromagnetic material(s) used for the auxiliary pole 140. Other methods may also be used to form the pole 130 including but not limited to full film deposition of the appropriate materials and removal for example via milling.

An additional auxiliary pole may optionally be provided, via step 210. Such an auxiliary pole 145 is depicted in FIGS. 3A and 4A.

The coil(s) 122 are also provided, via step 212. Portions of step 212 may thus be interleaved with the remaining steps of the method 200. For example, portions of the coils 122 may be provided before the formation of the main pole 130 and/or auxiliary pole 140. However, other portions of the coil 122 may be provided after some or all of the main pole 130 has been formed. Step 212 may also include depositing and patterning the material(s) used for the coil(s) 122. Step 212 may include forming one or more helical coils or one or more pancake/spiral coil. In such embodiments, a spiral coil 122 may include other turns far from the ABS.

The write gap 124 may be provided, via step 214. Step 214 includes depositing a nonmagnetic material. One or more layers may be deposited in step 214. The material may be conformally deposited. In addition, portions of the write gap may be removed to provide a write gap that has varying thicknesses.

The trailing shield 126 and/or side shields (not shown) may be provided, via step 216. Formation of the side shields may include removing material(s) in the location of the side shields, providing a mask and depositing the side shield material(s). In some embodiments, the side shield material(s) may be plated.

Using the method 200, the data storage device 100 and magnetic apparatuses 120, 120' and/or 120" may be provided. Thus, the benefits of the magnetic apparatuses 120, 120' and/or 120" may be achieved.

FIG. 6 depicts an exemplary embodiment of a method 250 for providing a portion of a magnetic recording apparatus. More specifically, the method 250 is used to provide the auxiliary and main poles. In the method 250 the steps performed to provide the auxiliary and main poles are interleaved. For simplicity, some steps may be omitted, interleaved, combined and/or include substeps. FIGS. 7A-7B through 14A-14B depict various views of an exemplary embodiment of a magnetic recording apparatus 300 during fabrication using the method 250. The method 250 is thus described in the context of providing the magnetic recording apparatus 300 depicted in FIGS. 7A-7B through 14A-14B. The method 250 may also be used to fabricate other magnetic recording apparatuses including but not limited to any combination of 120, 120' and/or 120". The method 250 may be used to fabricate multiple magnetic recording heads at substantially the same time. The method 250 is also described in the context of particular layers. A particular layer may include multiple materials and/or multiple sub-layers. The method 250 also may start after formation of other portions of the magnetic recording apparatus. For example, the method 250 may start after a read apparatus, return pole/leading shield and/or other structure have been fabricated.

A trench for the auxiliary pole is formed in a first nonmagnetic layer, via step 252. Step 252 may include providing a mask and performing a reactive ion etch (RIE) of the exposed nonmagnetic layer. In some embodiments, the first nonmagnetic layer is aluminum oxide. FIGS. 7A and 7B depict apex and top views the magnetic recording apparatus 300 after formation of the trench in step 252. Thus, the first nonmagnetic layer 302 and mask 304 are shown. Also depicted is the trench 306 for the auxiliary pole. The auxiliary pole trench 302 has a shape and location corresponding to the auxiliary pole being formed. In the embodiment shown, the auxiliary pole trench 306 has sidewalls that form a nonzero acute angle with the MFS. In the embodiment shown, a disk drive is being formed. Thus, the MFS is an air-bearing surface (ABS). The location of the ABS is indicated by a dashed line. The ABS location indicates where the ABS is formed after lapping.

Figure 8A:
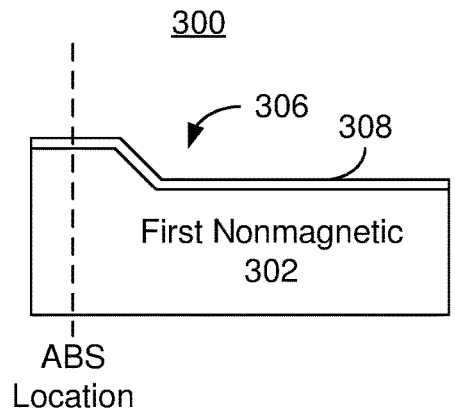
Figure 8B:
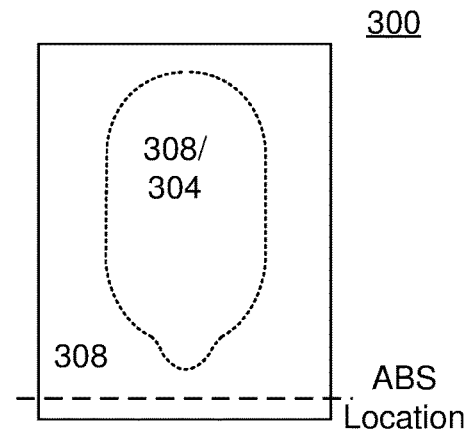

An etch stop layer is deposited after the auxiliary pole trench 306 is formed, via step 254. The etch stop layer may be a Ru layer. Other materials may be used in other embodiments. FIGS. 8A and 8B depict apex and top views of the magnetic write apparatus 300 after step 254 is performed. Thus, the etch stop layer 308 is shown.

Figure 9A:
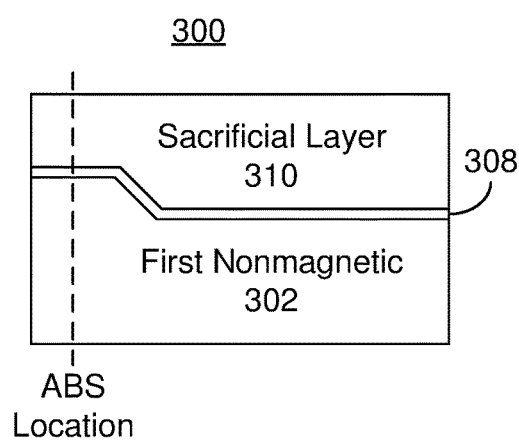
Figure 9B:
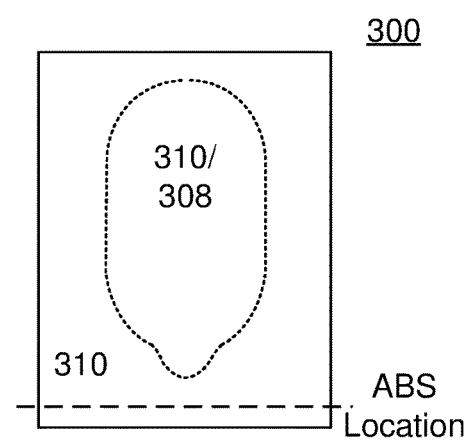
Figure 10A:
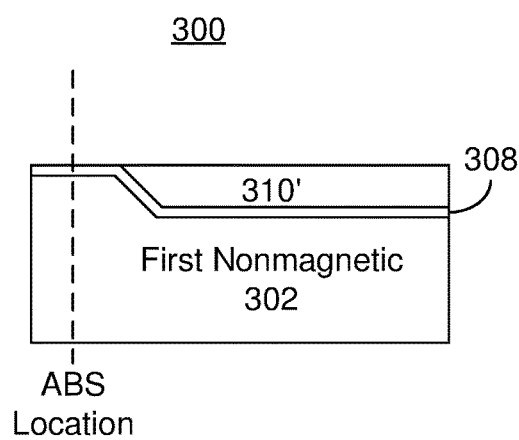
Figure 10B:
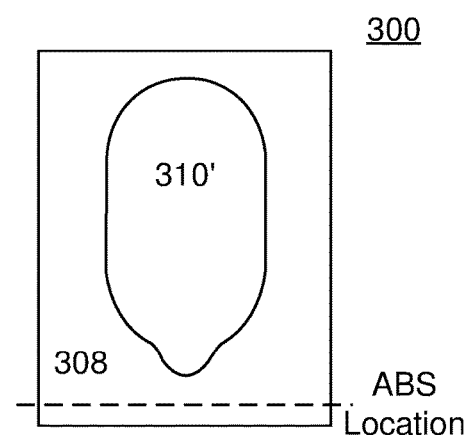

A sacrificial layer is provided, via step 256. The sacrificial layer fills the auxiliary pole trench 306. Step 256 may include depositing the sacrificial materials and then performing a planarization step, such as a chemical mechanical planarization (CMP). FIGS. 9A and 9B depict apex and top views of the magnetic write apparatus 300 after a portion of step 256 is performed. Thus, the sacrificial material 310 has been deposited. The sacrificial layer 310 may be selected from NiFe, a CoNiFe, aluminum oxide and Cu. The sacrificial layer provided in step 256 may thus be selected from one or more of these materials. FIGS. 10A and 10B depict apex and top views of the magnetic write apparatus 300 after step 256 is completed. Thus, the sacrificial layer 310' fills the auxiliary trench 306 (not labeled in FIGS. 10A-10B), but does not reside outside of the auxiliary pole trench 306.

Figure 11A:
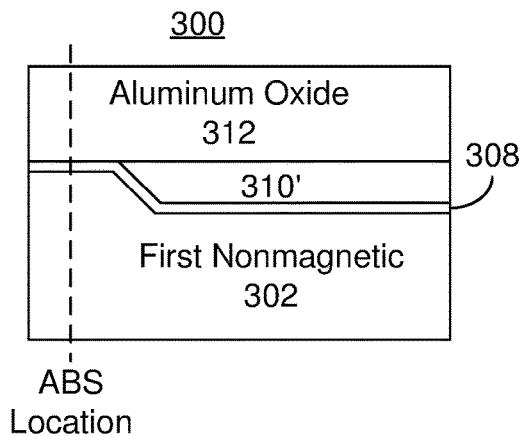
Figure 11B:
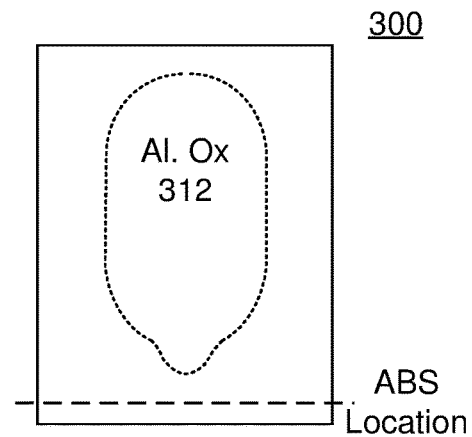

A second nonmagnetic layer is deposited, via step 258. Step 258 may include depositing an aluminum oxide or other layer. FIGS. 11A and 11B depict apex and top views of the magnetic write apparatus 300 after step 258 is performed. Thus, an aluminum oxide layer 312 is shown.

Figure 12A:
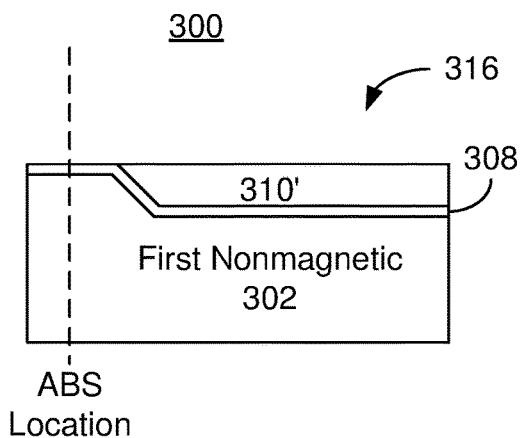
Figure 12B:
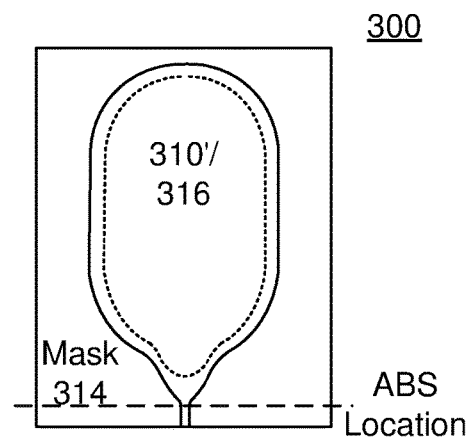
Figure 12C:
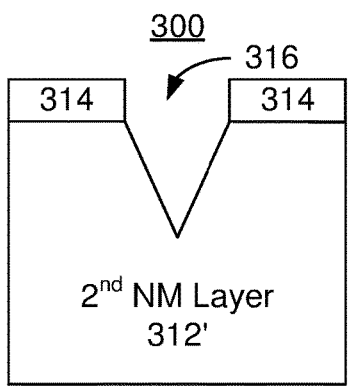
Figure 12D:
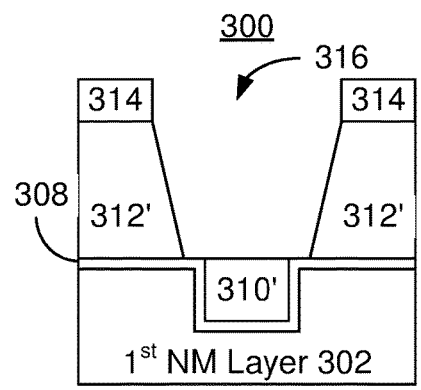
Figure 13A:
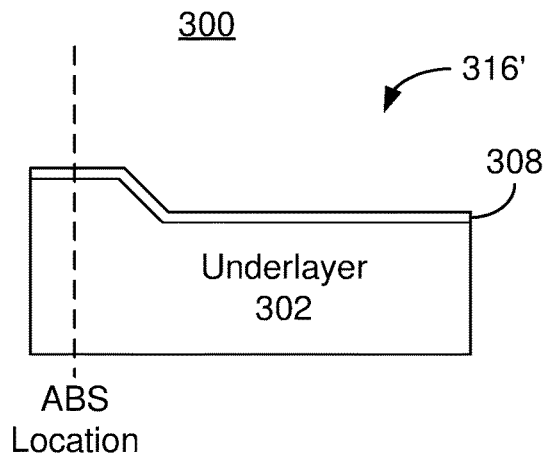
Figure 13B:
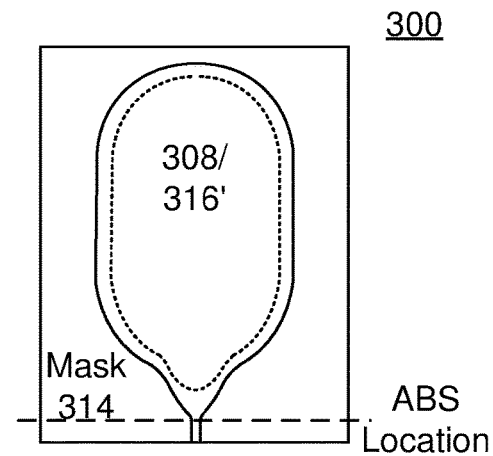
Figure 13C:
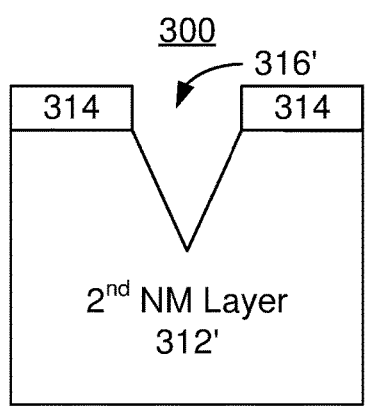
Figure 13D:
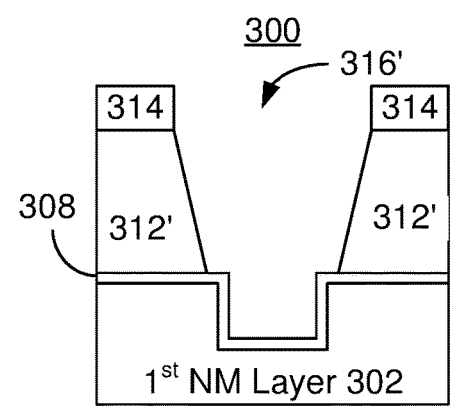

A trench for the main pole is provided in the second nonmagnetic layer, via step 260. Step 260 may include providing a mask having an aperture for the trench of the main pole and performing an RIE or other etch step. The aperture may have the shape and location desired for the main pole. Thus, the trench may have a large aspect ratio as defined above as well as rounded corners. FIGS. 12A, 12B, 12C and 12D depict apex, top, ABS location and recessed views of the magnetic write apparatus 300 after step 260 is performed. The recessed view shown in FIG. 12D is taken along a surface parallel to the ABS location, but closer to the yoke. Thus, a trench 316 for the main pole has been formed in the second nonmagnetic layer 312'. Note that the width and depth of the main pole trench 316 varies. In addition, at least a portion of the sacrificial layer 310' is exposed by the main pole trench 316.

A remaining portion of the sacrificial layer 310' is removed, via step 262. This step may be performed using a wet etch appropriate for the sacrificial layer 310'. For example, the wet etch may be an aluminum oxide wet etch, a NiFe wet etch, a CoNiFe wet etch or a Cu wet etch. FIGS. 13A, 13B, 13C and 13D depict apex, top, ABS location and recessed views of the magnetic write apparatus 300 after step 262 is performed. Thus, the trench 316' includes not only the region for the main pole, but also for the auxiliary pole.

Figure 14A:
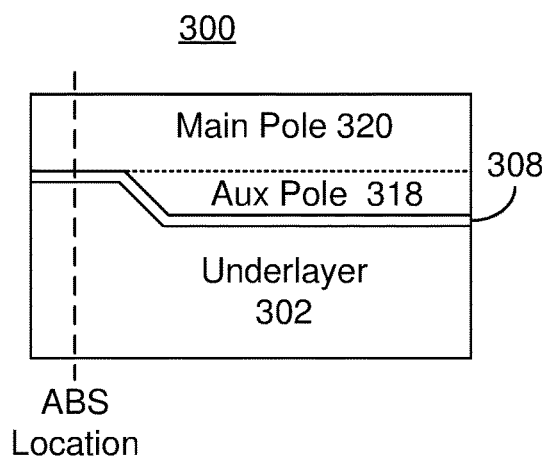
Figure 14B:
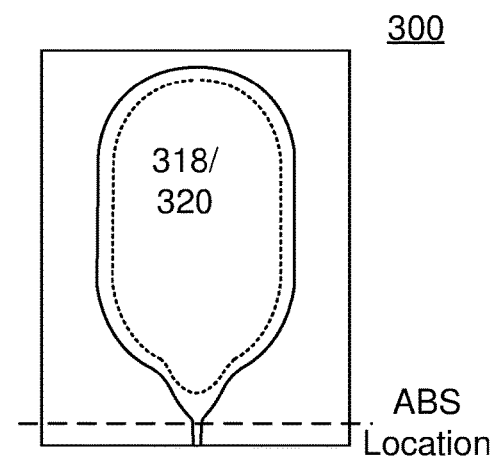

A high saturation magnetization magnetic layer is provided, via step 264. Step 264 may include depositing a seed or nonmagnetic gap layer, and then depositing the material(s) for the poles. The high saturation magnetization magnetic layer fills the auxiliary pole trench and at least a portion of the main pole trench. Stated differently, the trench 316' is filled. FIGS. 14A and 14B depict apex and top views of the magnetic write apparatus 300 after step 264 is performed. Thus, the main pole 320 and auxiliary pole 318 have been formed. Because these structures 318 and 320 are formed of the same material, they are separated by a dashed line. The auxiliary pole 318 and main pole 320 have the desired shape and location.

Using the method 250, the magnetic recording apparatus 300 may be provided. The short yoke length, large aspect ratio and flare of the main pole 320 in conjunction with the auxiliary pole 318 may allow for reduced rise time and improved saturation performance while maintaining a sufficient write field. In addition, the write apparatus 300 may still have acceptable WATEr and domain lockup. Thus, performance of the write apparatus 300 may be improved.

What is claimed is:

1. A magnetic write apparatus having a media-facing surface (MFS) comprising:
   a main pole including a pole tip and a yoke, the pole tip occupying a portion of the MFS and being between the yoke and the MFS, the yoke having a yoke length in a yoke direction perpendicular to the MFS, the yoke length being measured from the MFS and being less than four microns, the main pole having a total length in the yoke direction and a width in a cross-track direction parallel to the MFS, the main pole being continuous along the total length, the total length being measured from the MFS to a pole back and being greater than the yoke length, an aspect ratio being the total length divided by the width, the aspect ratio exceeding one, the main pole including at least one side surface having a flare angle from the MFS, the flare angle being nonzero and acute;
   an auxiliary pole adjacent to the main pole and having a front surface recessed from the MFS by not more than 1.05 micron; and
   at least one coil for energizing the main pole, the at least one coil having not more than two turns.

2. The magnetic write apparatus of claim 1 wherein the aspect ratio is at least 1.2 and not more than 2.

3. The magnetic write apparatus of claim 1 wherein the flare angle is at least thirty degrees and not more than seventy degrees.

4. The magnetic write apparatus of claim 3 wherein the flare angle is at a flare point at least 0.1 micron and not more than 0.45 micron from the MFS.

5. The magnetic write apparatus of claim 1 wherein the auxiliary pole is recessed by at least 0.1 micron and not more than 0.45 micron from the MFS.

6. The magnetic write apparatus of claim 5 wherein the auxiliary pole has a thickness in a down track direction perpendicular to the cross-track direction of at least 0.2 micron and not more than 0.5 micron.

7. The magnetic write apparatus of claim 5 wherein the auxiliary pole has a plurality of sides at at least one angle from a down track direction perpendicular to the cross-track direction, the at least one angle being at least fifteen degrees and not more than fifty degrees.

8. The magnetic write apparatus of claim 5 wherein the auxiliary pole includes at least one magnetic material having a saturation magnetization of at least 2.4 T.

9. The magnetic write apparatus of claim 5 wherein the auxiliary pole has an auxiliary pole width in the cross-track direction, the auxiliary pole width being not wider than the width and not smaller than 0.3 micrometers less than the width of the main pole.

10. The magnetic write apparatus of claim 1 wherein the main pole has at least one back corner having a radius of curvature of at least two microns and not more than four microns.

11. The magnetic write apparatus of claim 1 further comprising:
    a trailing shield; and
    a write gap, a portion of the write gap residing between the trailing shield and the pole tip.

12. The magnetic write apparatus of claim 1 wherein the total length is not more than ten microns.

13. A data storage device comprising:
    a media; and
    a magnetic write apparatus having a media-facing surface (MFS), the magnetic write apparatus including a main pole, an auxiliary pole and at least one coil for energizing the main pole, the at least one coil having not more than two turns, the main pole including a pole tip and a yoke, the pole tip occupying a portion of the MFS and being between the yoke and the MFS, the yoke having a yoke length in a yoke direction perpendicular to the MFS, the yoke length being measured from the MFS and less than four microns, the main pole having a total length in the yoke direction and a width in a cross-track direction parallel to the MFS, the total length being measured from the MFS to a pole back and being greater than the yoke length, the main pole being continuous along the total length, an aspect ratio being the total length divided by the width, the aspect ratio exceeding one, the main pole including at least one side surface having a flare angle from the MFS, the flare angle being nonzero and acute, the auxiliary pole adjacent to the main pole and having a front surface recessed from the MFS by not more than 1.05 micron.

14. The data storage device of claim 13 wherein the aspect ratio is at least 1.2 and not more than 2, the flare angle is at least thirty degrees and not more than seventy degrees and the flare angle is at a flare point at least 0.1 micron and not more than 0.45 micron from the MFS.

15. The data storage device of claim 13 wherein the auxiliary pole is recessed by at least 0.1 micron and not more than 0.45 micron from the MFS, the auxiliary pole has a thickness in a down track direction perpendicular to the cross-track direction of at least 0.2 micron and not more than 0.5 micron, the auxiliary pole includes at least one magnetic material having a saturation magnetization of at least 2.4 T and the auxiliary pole has a plurality of sides at at least one angle from a down track direction perpendicular to the cross-track direction, the at least one angle being at least fifteen degrees and not more than fifty degrees, the auxiliary pole having an auxiliary pole width in the cross-track direction, the auxiliary pole width being not wider than the width and not smaller than 0.3 micrometers less than the width of the main pole.

16. The data storage device of claim 13 wherein the main pole has at least one back corner having a radius of curvature of at least two microns and not more than four microns and wherein the total length is not more than ten microns.

17. A method for providing a magnetic write apparatus having a media-facing surface (MFS) comprising:
    providing an auxiliary pole having a front surface recessed from the MFS by not more than 1.05 micron;
    providing a main pole adjacent to the auxiliary pole, the main pole including a pole tip and a yoke, the pole tip occupying a portion of the MFS and being between the yoke and the MFS, the yoke having a yoke length in a yoke direction perpendicular to the MFS, the yoke length being measured from the MFS and less than four microns, the main pole having a total length in the yoke direction and a width in a cross-track direction parallel to the MFS, the total length being measured from the MFS to a pole back and being greater than the yoke length, the main pole being continuous along the total length, an aspect ratio being the total length divided by the width, the aspect ratio exceeding one, the main pole including at least one side surface having a flare angle from the MFS, the flare angle being nonzero and acute; and
    providing at least one coil for energizing the main pole, the at least one coil having not more than two turns.

18. The method of claim 17 wherein the step of providing the auxiliary pole further includes:
    forming an auxiliary pole trench in a first nonmagnetic layer, the auxiliary pole trench having a shape and location corresponding to the auxiliary pole;
    depositing an etch stop layer after the step of forming the auxiliary pole trench;
    providing a sacrificial layer, the sacrificial layer filling the auxiliary pole trench; and
    wherein the step of providing the main pole further includes depositing a second nonmagnetic layer;
    forming a main pole trench in at least the second nonmagnetic layer, a portion of the sacrificial layer being exposed by the main pole trench;
    removing a remaining portion of the sacrificial layer using a wet etch; and
    providing a high saturation magnetization magnetic layer, the high saturation magnetization magnetic layer filling the auxiliary pole trench and at least a portion of the main pole trench.

19. The method of claim 18 wherein the sacrificial layer is selected from NiFe, a CoNiFe, aluminum oxide and Cu.

20. The method of claim 17 wherein the aspect ratio is at least 1.2 and not more than 2, the flare angle is at least thirty degrees and not more than seventy degrees and the flare angle is at a flare point at least 0.1 micron and not more than 0.45 micron from the MFS.

21. The method of claim 17 wherein the auxiliary pole is recessed by at least 0.1 micron and not more than 0.45 micron from the MFS, the auxiliary pole has a thickness in a down track direction perpendicular to the cross-track direction of at least 0.2 micron and not more than 0.5 micron, the auxiliary pole includes at least one magnetic material having a saturation magnetization of at least 2.4 T and the auxiliary pole has a plurality of sides at at least one angle from a down track direction perpendicular to the cross-track direction, the at least one angle being at least fifteen degrees and not more than fifty degrees, the auxiliary pole having an auxiliary pole width in the cross-track direction, the auxiliary pole width being not wider than the width of the main pole and not smaller than 0.3 micrometers less than the width of the main pole.

22. The method of claim 17 wherein the main pole has at least one back corner having a radius of curvature of at least two microns and not more than four microns and wherein the total length is not more than ten microns.

* * * * *